Nov. 25, 1947.   F. V. WIND ET AL   2,431,629
METHOD OF PRODUCING CERAMIC ARTICLES
Filed Feb. 28, 1944
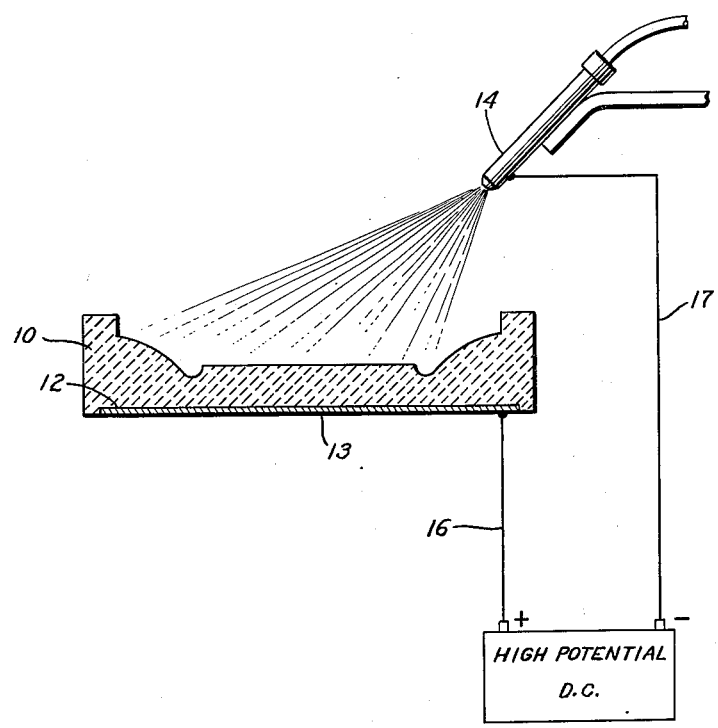
Fred V. Wind
Matthew J. Raimondo
INVENTORS
BY 
ATTORNEY

UNITED STATES PATENT OFFICE 2,431,629

METHOD OF PRODUCING CERAMIC ARTICLES

Fred V. Wind, Montrose, and Matthew J. Raimondo, Los Angeles, Calif., assignors to Pacific Clay Products, Los Angeles, Calif., a corporation of California Application February 28, 1944, Serial No. 524,294

4 Claims. (Cl. 25—156)

This invention pertains to methods for manufacturing ceramic articles such as dinnerware, decorative ware, vases, trays and the like, and other ceramic objects. The methods of the present invention permit the utilization of highly desirable ceramic compositions which could not be successfully employed in the past and permit the manufacture of various formed ceramic objects rapidly and inexpensively, the finished objects being characterized by great strength, lightness and thinness of wall sections and freedom from internal strains.

The manufacture of so-called chinaware and other formed objects from ceramic compositions has ordinarily involved the forming or molding of the object. A ceramic object may be molded by pressing (as in the manufacture of tile) or it may be formed by spinning a "bat" of ceramic composition upon the potter's wheel. A still further method of forming objects has involved the use of what are known as "clay slips," these being aqueous suspensions or dispersions of clay compositions. These clay slips were ordinarily poured into plaster molds, the porous plaster absorbing the water from the liquid suspension and permitting the solids to be retained upon the inner surfaces of the plaster mold. After preliminary drying, the clay objects thus formed were liberated from the molds and often jiggered or contoured to final shape. For example, dinner plates have been made by casting from a slip in a plaster of Paris mold and then supported upon a rotating table while a profile tool was brought into contact with one of the surfaces so as to impart a desired finished contour or shape to the still plastic object.

Most forming, casting or jiggering operations require the use of relatively plastic ceramic compositions. The clay slips employed contain high proportions of water. Clay compositions or compositions in which clay forms the major ingredient tenaciously retain water and can be dried with difficulty. Shrinkage problems (both during drying and subsequent burning) are also encountered. The usual ceramic composition is incapable of producing a vitreous or semi-vitreous finished body, while this condition is substantially essential in chinaware or other ceramic objects designed to hold liquids, foods, etc.

In contradistinction to the previous practices, the present invention employs what may be termed a short ceramic body, this identifying a body which is not plastic or fat. Moreover, the preferred compositions of the present invention are substantially free from feldspar and contain but limited amounts of clays. Moreover, instead of employing liquid, dilute or thin slips which are poured into the plaster molds in the form of a continuous liquid, the methods of the present invention employ relatively thick dispersions or suspensions containing not more than about 50% by weight of water.

The method of the present invention further distinguishes from the prior practices in that the ceramic composition employed is disseminated so as to form a mist or fog and the particles of such disseminated ceramic composition are then deposited upon a porous matrix. In this manner, the minute particles of ceramic composition are permitted to orient themselves so as to form a coherent body or article of extremely thin wall thickness. The process of the present invention permits the production of coherent objects, sufficiently strong in their unburned state, to be readily handled, even though the walls are only 0.04 inch thick. The methods described herein insure the production of objects of uniform wall thickness and such objects need not be subjected to the jiggering and finishing operations which had been employed in the past, and as a consequence of these various factors, the finished objects are free from internal strains and exhibit extremely high mechanical strength.

A further adaptation of the present invention also contemplates the use of molds or forms which are made from ceramic composition (instead of plaster of Paris), such molds or matrices being lighter, more easily handled by female workers and exhibiting much longer life.

It is an object of the present invention, therefore, to disclose and provide improved methods of procedure for use in the manufacture of ceramic objects.

A further object of the invention is to disclose and provide a method of depositing finely divided ceramic compositions upon porous molds whereby thin, coherent and strong objects, free from internal strains, may be produced.

An object of the present invention, moreover, is to disclose and provide methods of manufacturing vitreous and semi-vitreous ware from short ceramic compositions.

Still another object of the invention is to produce thin wall chinaware and other ceramic objects which need not be subjected to a secondary form of finishing operation such as jiggering, the objects being provided with smooth, easily decorated surfaces.

These and other objects, uses, advantages and characteristics of the invention will become apparent to those skilled in the art from the following description when taken in connection with the accompanying drawings, in which certain exemplary compositions will be specifically referred to.

In the drawings:

Fig. 1 is a diagrammatic illustration of an apparatus illustrating one manner in which the invention may be carried out.

Referring to the drawings, there is provided a porous mold or matrix 10, shown in section. The upper face 11 may be formed to produce an article of an especially designed configuration; that is, the contour of an object to be formed. It is important in the present invention that the mold or matrix 10 constitute an electrode of an electrostatic field. To this end there may be provided a recess 12 in the bottom of the matrix 10 for receiving an electrode 13 which may be of relatively large area. As will be hereinafter explained, a suitable nozzle 14, made of electrically conductive material, is provided in conjunction with an apparatus, not shown, for disseminating a raw, moisture-containing, ceramic composition to form a mist through the nozzle 14 with the view of depositing upon the porous matrix 10 the particles of such composition. In order that the matrix 10 may constitute an electrode of an electrostatic field, there is provided a source of power 16, preferably of high potential, direct current, the positive or anode terminal of the source of power 16 being connected to the electrode 13 by way of a conductor 16. The negative side of the source of power 16 is connected to the nozzle 14 by way of the conductor 17. A desired electrostatic field is produced between the matrix 10 and the nozzle 14. Whether or not each particle deposited upon the matrix is charged with electricity or whether it is the general electrostatic field that produces the result is not clear. However, experimentation has conclusively proven that this method of depositing such a composition in mixed form upon a matrix having a predetermined contour produces a coherent article that may be removed from the matrix, which article may thereafter be burned to maturity.

It is preferable that the matrix contain a large portion of steatite, talc or other analogous magnesium silicate, the purpose of which will be hereafter fully explained.

It has been discovered that ceramic bodies particularly adapted for use in making thin chinaware and the like should contain a large proportion of steatite, talc or other analogous magnesium silicate. It has been determined, also, that the talc employed should be dehydrated or calcined, in part at least, before being incorporated into the ceramic body. Some clay may be employed in the composition but not as a major ingredient. Small quantities of ball clay or so-called ivory fat clay may be used with advantage. Feldspar and kaolinite are not preferred ingredients. Small quantities of sodium silicate, barium carbonate, dextrin, soda ash, sodium carbonate or other deflocculating agent, stabilizing agent or temporary binder may also be introduced.

All of the ingredients employed should be reduced to a fine state of division. In actual practice, grinding of the ingredients so as to pass a 200 mesh sieve (dry) has been found desirable. Exemplary compositions are as follows:

| | A | B |
|---|---|---|
| | *Pounds* | *Pounds* |
| Calcined talc | 2,100 | 250 |
| Raw talc | 875 | 250 |
| Ball clay | 385 | 88 |
| Ivory fat clay | 140 | |
| Sodium silicate | 4 | |
| Dextrin | | 11 |
| Water | 1,350 | 92 |

In both of the above examples the talc employed was steatite. The calcined talc was calcined in lump or granular form and then finely crushed. It will be noted that the water content of the compositions ranges from 13% in B to 28% in A. Usually the water content is maintained between about 12% and 35% of the total, and at no time is it in excess of 45% or 50%. The clay content amounts to between 14% and 15% of the total solids in A and B. Usually the clay content is maintained between 10% and 25% of the total solids (dry basis), the talc comprising the major ingredient. Between about 40% and 70% of the total solids comprise calcined talc. Both of the bodies are distinctly short and both can be burned to a maturing temperature of about 2150–2200° F.

In making chinaware, hotel ware and other ceramic objects, ordinary plaster of Paris molds may be employed but preferably the molds are made of a steatite composition which may be similar to that given hereinabove in the examples except that the ingredients need not be ground to the same extent. Moreover, the ceramic body used in making the molds preferably contains larger amounts of water so as to produce a more porous unburned body. The resulting mold or matrix, if made from a steatite composition, can be provided with walls which are appreciably thinner than the walls of an ordinary plaster of Paris mold. As a result, the mold is of materially reduced weight and can be handled more quickly and readily. Steatite molds have a very much longer life and may be dried rapidly and repeatedly at temperatures of 500° F. to 800° F. Surfaces of steatite molds may be ground or carved to impart fine details to the finished ware. It is to be remembered that the ordinary plaster of Paris mold can only be employed in the production of a limited number of articles, whereas the steatite molds may be used for thousands of articles before being exhausted.

In carrying out the process of the present invention, a ceramic composition of the character described hereinabove is disseminated to form a mist or fog. Spray guns or atomizing nozzles may be used. Spray or fog may be directed toward the mold or matrix, or a tunnel or chamber may be filled with such fog or mist which then deposits upon the porous molds contained in such chamber.

It is believed that the dissemination of the ceramic composition into a mist or fog imparts a static charge to each of the minute droplets. When these minute particles fall upon the matrix, it may be that cataphoresis and electrical endosmose phenomena take place, permitting the solids to orient themselves and form a dense body while the liquid phase is rapidly transferred to the matrix. That denser finished articles are obtained by the process of this invention is readily demonstratable.

It is known that more uniform articles are produced by this process, each article being of uniform thickness and physical characteristics. It is also definitely known that the articles are formed more quickly; the articles are capable of being formed and ready for removal from the matrix within a very few minutes, whereas hours are necessary in prior slip-casting methods.

The deposition of the mist or fog upon the matrix may be facilitated by the use of a high potential electrostatic field in a zone contiguous to the matrix. The matrix itself may form an electrode, generally the anode. Another electrode or electrodes may be positioned in the vicinity of the matrix. In the event the matrix is charged, it is only necessary to disseminate the fog of ceramic composition into the field caused by the charged surface.

Those skilled in the art will readily adapt the modifications of the Lodge-Cottrell process to the process of the present invention, in accordance with the teachings hereof. It may be noted that fields obtained by the use of direct currents at 30,000 and 50,000 volts give good results, but these examples are not to be construed as limiting in any manner.

An object formed in a mold or matrix by the performance of the method described, may be removed from its mold within a few minutes. This permits large numbers of articles or objects to be made with a small number of molds, and obviates the large storage space which is usually allocated to molds containing castings.

The green, unburned articles removed from the molds will be found to be provided with smooth surfaces, to be of remarkably uniform thickness, and to be fairly dry. The objects are sufficiently strong to be readily handled during drying, wiping of edges, placement and stacking in kilns, etc. They may be first subjected to a bisque burn and then to a glost burn. If desired, the green, unburned articles may be coated with a desirable transparent or opaque glaze composition and subjected to a single burning to mature both body and glaze.

The preferred body compositions for use in this process burn to a light colored, almost white and homogeneous body. Their extreme density is well exemplified by the remarkably low absorption of even the unglazed bisque objects; absorption of less than 0.05% and usually on the order of 0.003% is obtained. Compressive strengths of 115,000 to 120,000 pounds per square inch are obtained; the modulus of rupture of one composition was found to be over 19,000 pounds to the square inch (on 3 inch centers). The finished objects are highly resistant to chipping and the methods and compositions described herein are eminently suited for the manufacture of hotel china, where light weight, negligible absorption and high resistance to mechanical and thermal shock are desirable. Thin walled, glazed articles made by the processes here described, are highly translucent and free from strains and inequalities.

It is to be understood that any type of article or object may be made by the methods and from the compositions herein described. Numerous modifications and adaptations are embraced by this invention. The specific equipment employed may vary with conditions and the magnitude of the operations being performed. The spray, fog or mist may be formed by forcing the composition through suitable nozzles either by a directly applied pressure or by the use of atomizing air, steam or fluid. The fineness to which the composition is ground is influenced somewhat by the nozzles used and the thickness desired in the finished article. Although thin walled articles (0.04 to 0.08 inch) have been specifically mentioned, this is not to be considered as a limitation since objects of any desired thickness can be successfully made.

All changes, modifications and adaptations coming within the scope of the appended claims are embraced thereby.

We claim:

1. In a process of forming ceramic objects, the steps of: disseminating a raw, moisture-containing ceramic composition to form a mist, and depositing particles of such disseminated composition upon a porous matrix having a surface corresponding to contours of an object to be formed, said matrix constituting an electrode of an electro-static field, to form a layer of composition on such surface, removing a coherent article from said matrix and burning said article to maturity without subjecting the article to jiggering.

2. In a process of forming ceramic objects, the steps of: spraying an aqueous suspension containing ceramic body ingredients in a state of fine division to form a mist, and depositing particles of said sprayed suspension upon a ceramic porous matrix provided with a surface having contours corresponding to contours of an object to be formed, said matrix constituting an electrode of an electro-static field, to form a dense layer of composition on such surface, removing a coherent article of said ceramic composition from the matrix, and then drying and finally burning the article to maturity without subjecting the article to jiggering.

3. In a process of producing vitreous ceramic objects having an absorption of less than 0.05%, the steps of: spraying a moisture-containing ceramic composition to form a mist, the solids in said composition consisting essentially of raw and calcined steatite in major proportion and a minor proportion of clay, said solids being in a state of fine division, depositing particles of such disseminated composition upon a porous matrix having a surface corresponding to contours of an object to be formed, said matrix constituting an electrode of an electro-static field, to form a layer of composition on such surface, removing a coherent article made from such composition from the matrix, and then drying and finally burning the article to maturity, without subjecting the article to jiggering.

4. In a process of producing vitreous ceramic objects having an absorption of less than 0.05%, the steps of: spraying a moisture-containing ceramic composition to form a mist, said composition containing between 12% and 35% by weight of water and between 88% and 65% by weight of ceramic body ingredients; depositing particles of such disseminated composition upon a porous matrix having a surface corresponding to contours of an object to be formed, said matrix constituting an electrode of an electrostatic field, to form a layer of composition on such surface; removing a coherent article made from such composition from the matrix and then drying and finally burning the article to maturity, without subjecting the article to jiggering.

FRED V. WIND.
MATTHEW J. RAIMONDO.

REFERENCES CITED

The following references are of record in the file of this patent:

UNITED STATES PATENTS

| Number | Name | Date |
|---|---|---|
| 1,997,263 | Meissner | Apr. 9, 1935 |
| 2,048,651 | Norton | July 21, 1936 |
| 2,213,495 | Hagar | Sept. 3, 1940 |
| 2,270,075 | Miller | Jan. 13, 1942 |
| 2,307,698 | Melton | Jan. 5, 1943 |
| 2,334,648 | Ransburg | Nov. 16, 1943 |